(12) United States Patent
Moriyama et al.

(10) Patent No.: US 6,921,218 B2
(45) Date of Patent: Jul. 26, 2005

(54) PRINTING APPARATUS

(75) Inventors: Jiro Moriyama, Kanagawa (JP); Yuji Hamasaki, Kanagawa (JP); Hidehiko Kanda, Kanagawa (JP); Norihiro Kawatoko, Kanagawa (JP); Toshiyuki Chikuma, Kanagawa (JP); Atsushi Sakamoto, Kanagawa (JP); Aya Sugimoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/718,721

(22) Filed: Nov. 24, 2003

(65) Prior Publication Data

US 2004/0101339 A1 May 27, 2004

(30) Foreign Application Priority Data

Nov. 26, 2002 (JP) ........................ 2002-342628

(51) Int. Cl.[7] ................................. B41J 5/30
(52) U.S. Cl. ............................. 400/62; 400/63; 400/76; 358/1.15
(58) Field of Search ................................ 400/61–63, 70, 400/71, 76; 358/1.15, 1.9

(56) References Cited

U.S. PATENT DOCUMENTS

| | | | |
|---|---|---|---|
| 5,739,828 A | 4/1998 | Moriyama et al. | 347/9 |
| 6,084,606 A | 7/2000 | Moriyama | 347/19 |
| 6,120,129 A | 9/2000 | Iwasaki et al. | 347/43 |
| 6,145,950 A | 11/2000 | Ohtsuka et al. | 347/15 |
| 6,371,592 B1 | 4/2002 | Otsuka et al. | 347/19 |
| 2003/0081031 A1 | 5/2003 | Moriyama et al. | 347/15 |
| 2004/0032620 A1 * | 2/2004 | Tanaka et al. | 358/1.16 |
| 2004/0046817 A1 * | 3/2004 | Kato et al. | 347/15 |

FOREIGN PATENT DOCUMENTS

JP 10-264485 10/1998

* cited by examiner

*Primary Examiner*—Minh Chau
(74) *Attorney, Agent, or Firm*—Fitzpatrick, Cella, Harper & Scinto

(57) ABSTRACT

There is provided a printing apparatus capable of printing input data in proper adaptation to plural types of printing data input units and environments of use. For this purpose, the type of an input unit is first recognized. For example, when it is recognized that a personal computer capable of causing the printing apparatus to perform a setting process for registration is connected, it is judged that the process has already been performed, and a mode for printing at a high speed is adopted. When it is recognized that a digital camera is connected, since it is likely that the process has not been performed yet, a mode for printing at a low speed is adopted to prevent any reduction in image quality.

21 Claims, 8 Drawing Sheets

PRINTING APPARATUS

This application claims priority from Japanese Patent Application No. 2002-342628 filed Nov. 26, 2002, which is incorporated hereinto by reference.

BACKGROUND OF THE INVENTION

1. Field of the Invention

The present invention relates to a printing apparatus and a printing system.

2. Description of the Related Art

Recently, techniques for processing and printing color image data have advanced, and systems for such purposes are rapidly spreading. Printing apparatus used in such systems employ various methods of printing. Above all, inkjet printing apparatus have come in use in a wide variety of applications such as printing terminals of systems and printing sections of copying machines and facsimile machines for the reasons that they generate little noise during printing, that the apparatus themselves are inexpensive and their running cost is small, and that the apparatus are small in size.

Recently, there is a significant trend toward diversification of input units that supply printing data to printing apparatus. Scanners, digital cameras, and even simple memory cards are frequently used as such units, to say nothing of personal computers. In addition, printing apparatus have come in use in a variety of environments such as offices and homes that are, so to speak, static environments in which the apparatus are connected to those input units and dynamic environments in which the apparatus are used as mobile apparatus. Therefore, printing apparatus are required to be connectable to various input units and, desirably, they are able to print printing data supplied from input units connected thereto in an optimum mode.

Printing apparatus employing the dot matrix printing method are the main trend because they are capable of printing at a high speed or high quality at a low cost. However, there is a significant recent trend toward printing dots with smaller diameters in order to obtain images with higher quality and higher definition, and this has resulted in more strict regulation of alignment between the printing positions of dots in respective tones (hereinafter also referred to as registration). The term "dot position aligning" implies a process of making corrections to align the printing positions of dots in respective tones when printing agents in a plurality of tones (the term "tones" implying colors and densities) are used. The term "dot position aligning" also implies even a process involved in printing in a single tone where corrections are made to align the printing positions of dots when printing is performed in both of a forward scanning and a reverse scanning, for example, in a serial printing method.

A process for performing such registration with high accuracy is disclosed in Japanese Patent Application Laid-open No. 10-264485 (1998). There is disclosed a technique in which a check pattern for a low resolution condition is printed substantially in the middle of a printing medium; an adjustment is made based on the pattern; and a check pattern for a high resolution condition is thereafter printed in a position in which no interference with the above check pattern occurs; and another adjustment is made based on the same While the disclosure primarily describes applications in inkjet printing apparatus, the technique is obviously applicable to other dot matrix type printing apparatus or methods and is advantageous also in thermal transfer type printing apparatus or methods utilizing an ink sheet in the form of a film, for example.

A setting for registration has been commonly made by a printing apparatus in response to activation by a printer driver of a computer or made by the computer through a process of adapting image data supplied by itself to the mode of printing. Recently, however, there are various input units for supplying printing data, and printing apparatus are used in various environments as described above.

No problem occurs when a printing apparatus is used by connecting it to a host apparatus which can supply image data after making adjustments for registration by itself or when a printing apparatus is configured to be able to make a setting for registration in response to a request from a host apparatus. However, a printing apparatus may be connected to a host apparatus which cannot supply adjusted data or transmit a request for a process of making a setting for registration depending on the environment in which they are connected. For example, digital cameras (including those integrated with mobile telephones in addition to standalone products) and scanner apparatus are rapidly spreading. In order to achieve compactness and light weights, those apparatus are frequently configured without even the capability of transmitting a request for the setting process for registration, not to speak of supplying adjusted data to a printing apparatus. In particular, when printing is performed without the intervention of a host apparatus such as when data are printed by simply reading them from a memory card directly, the setting process for registration may not be performed at all depending on the configuration of the printing apparatus. Furthermore, in the case of a low-cost printing apparatus it may not be configured to allow itself to perform the setting process for registration and to perform a process of correcting dot forming positions, and printing will be performed with no correction at all when no host apparatus is used.

SUMMARY OF THE INVENTION

It is an object of the invention to provide a printing apparatus capable of printing input data in proper adaptation to plural types of printing data input units and environments.

In a first aspect of the invention, there is provided a printing apparatus connectable to plural types of input units for supplying printing data, comprising:

plural types of printing modes;

means for recognizing the type of an input unit connected; and means for selecting a mode suitable for printing of printing data supplied from the connected input unit from among the plural types of printing modes according to the recognition.

In a second aspect of the invention, there is provided a printing apparatus connectable to plural types of input units for supplying printing data, comprising:

plural types of image processing modes having different resolutions;

means for recognizing the type of an input unit connected; and means for selecting a mode for processing printing data supplied from the connected input unit from among the plural types of image processing modes according to the recognition.

In a third aspect of the invention, there is provided a method for controlling a printing apparatus which is connectable to plural types of input units for supplying printing data and has plural types of printing modes, the method comprising the steps of:

recognizing the type of an input unit connected; and selecting a mode suitable for printing of printing data supplied from the connected input unit from among the plural types of printing modes according to the recognition.

The above and other objects, effects, features and advantages of the present invention will become more apparent from the following description of embodiments thereof taken in conjunction with the accompanying drawings.

DETAILED DESCRIPTION OF PREFERRED EMBODIMENTS

Embodiments of the invention will now be described with reference to the drawings.

In the present specification, the term "printing" implies not only forming meaningful information such as characters and graphics but also forming images, figures, and patterns in general on printing media whether they are meaningful or not and whether they are developed so as to be visually perceptible to human beings or not.

While the invention will be described below with reference to various embodiments in which it is applied to an inkjet printing apparatus utilizing ink as a printing agent, the invention may be advantageously applied to printing apparatus employing various printing methods such as thermal transfer type printers as long as they perform dot matrix printing.

Farther, the term "printing media" implies not only paper used in common printing apparatus but also materials in general that can accept printing agents such as ink, the materials including cloths and plastic films.

Furthermore, the term "ink" should be taken in a broad sense similarly to the above definition of "printing", and it is assumed here to represent a liquid which can be applied to a printing medium to be used for the formation of images, figures, and patterns or to be used for process the printing medium.

In addition, "adjustment of dot forming positions (registration)" in the embodiments of the invention implies a process of aligning a print obtained by a forward pass and a print obtained by a backward pass during bidirectional printing (they correspond to the first print and the second print, respectively), adjustment of dot forming positions being required between the prints. Alternatively, the term implies a process of aligning prints (the first print and the second print) obtained with a plurality of (two) printing heads respectively.

(Embodiment 1)

Figure 1:
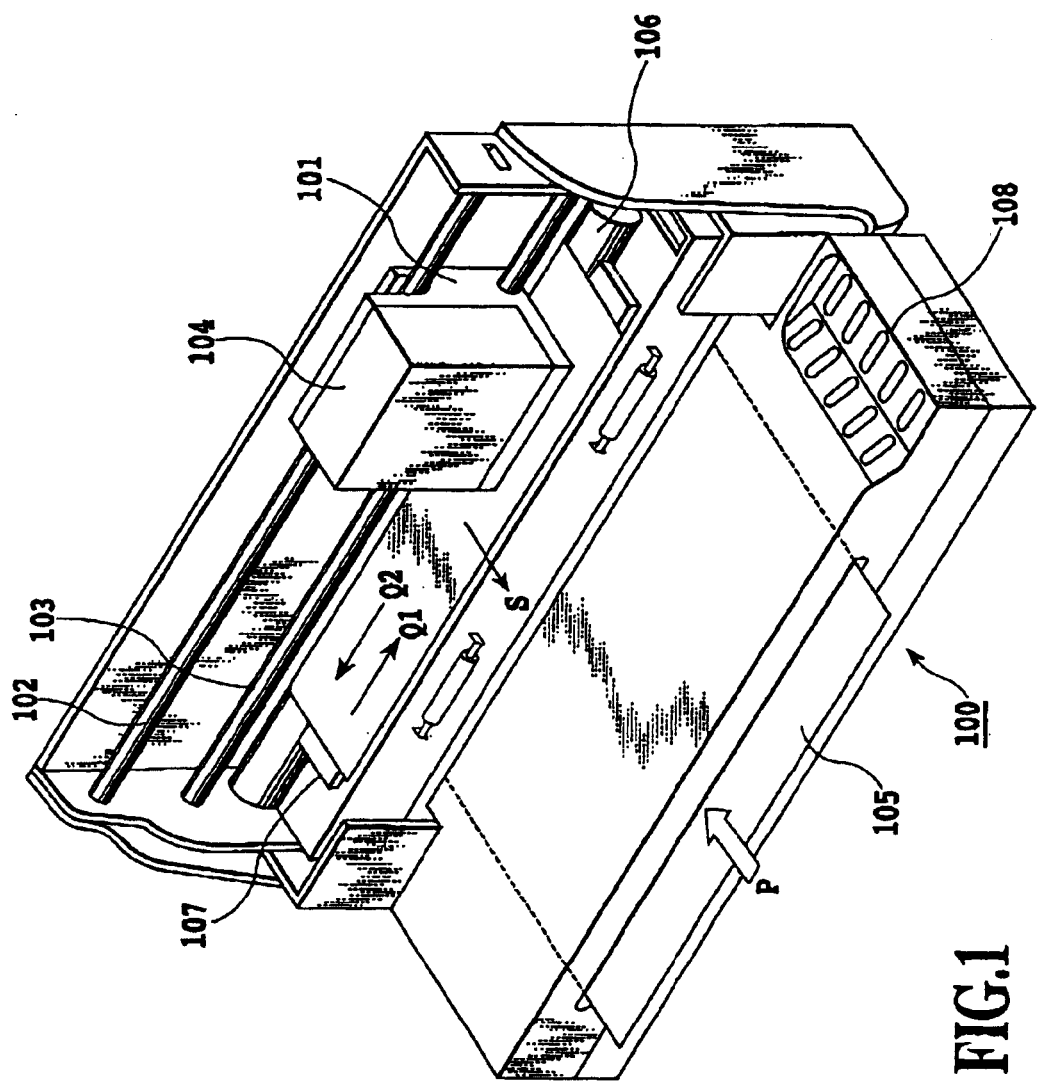
FIG. 1 is a perspective view showing a schematic configuration of an inkjet printing apparatus as an example of a printing apparatus to which the invention can be applied.

FIG. 1 is a perspective view showing a schematic configuration of an inkjet printing apparatus as an example of a printing apparatus to which the invention can be applied.

A printing medium 105 inserted into a paper feed position of a printing apparatus 100 is transported by a transport roller 106 in the direction of the arrow P to a printable region of a printing head 104. A platen 107 is provided in the printable region such that it is located under the printing medium 105. A carriage 101 is guided by two guide shafts 102 and 103 and is movable in a direction that is in parallel with the axial direction of the shafts. The carriage is driven by a main scanning motor (not shown), which is a stepping motor, for example, to scan a scanning area including a printing area back and forth in the directions indicated by the arrows Q1 and Q2 that are a main scanning direction. When one main scan is completed, the printing medium is transported a predetermined distance in a sub-scanning direction that is the direction indicated by the arrow P by driving a sub-scanning motor, which is not shown, in preparation for the next main scan. An operation of printing one page of the printing medium is performed by repeating the main scan and sub-scan.

Referring to FIG. 1, the printing head 104 carried by the carriage 101 includes an ejecting section having ejection openings from which ink can be ejected and an ink tank containing the ink, and the printing head is carried on the carriage such that the ink is ejected from the ejection openings on to a printing medium located under the same to perform printing. Reference numeral 108 represents an operation panel section having a switch portion used for switching a power supply of the printing apparatus on and off and for setting various printing modes and a display portion configured to be able to display states of the printing apparatus.

Figure 2:
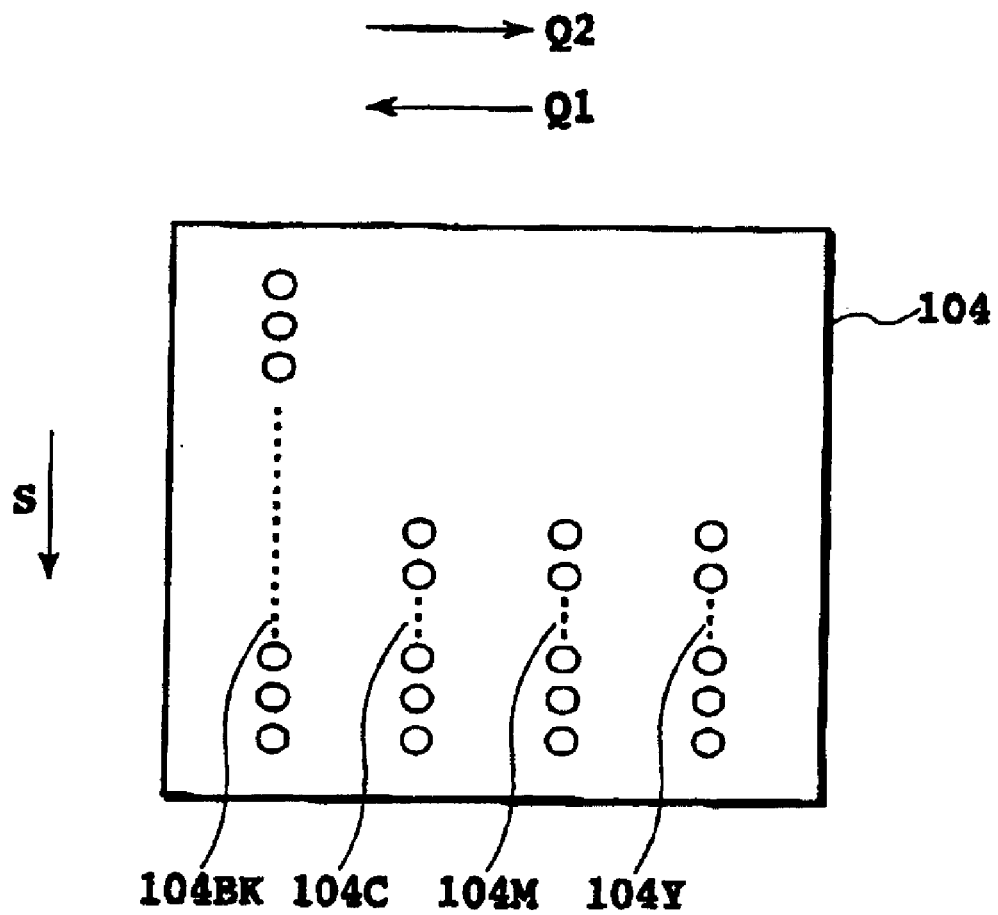
FIG. 2 is a schematic view for explaining a configuration of an ink ejecting section of a printing head in FIG. 1.

FIG. 2 is a schematic view for explaining a configuration of the ink ejecting section of the printing head 104. The printing head used in the present embodiment can eject ink in four colors, i.e., yellow (Y), magenta (M), cyan (C), and black (Bk). Each of 128 ejection openings 104C, 104M, and 104Y for yellow, magenta, and cyan, respectively, are arranged in parallel in the form of rows in a sub-scanning direction S for example, and 320 ejection openings 104Bk for black are arranged in parallel with them. The ejection openings for each color are provided at a pitch of 1/600 dpi (dot per inch) or about 42 mm in the sub-scanning direction. A driving frequency of the printing head is 15 kHz. and a printing operation can be performed at a density of 600 dpi in the main scanning direction. Therefore, the speed of a main scan of the carriage 101 during the printing operation is about 635 mm/s.

In a liquid path inside each of the ejection openings of the printing head 104, a heating element is provided which is an electrothermal transducer for generating thermal energy as energy used for ejecting ink in response to energization. A bubble is formed because of film boiling of ink in the liquid path that is rapidly heated by the heat generated by the heating element, and the ink is ejected in the form of, for example, a droplet because of a pressure resulting from the generation of the bubble to form characters and images on the printing medium.

Figure 3:
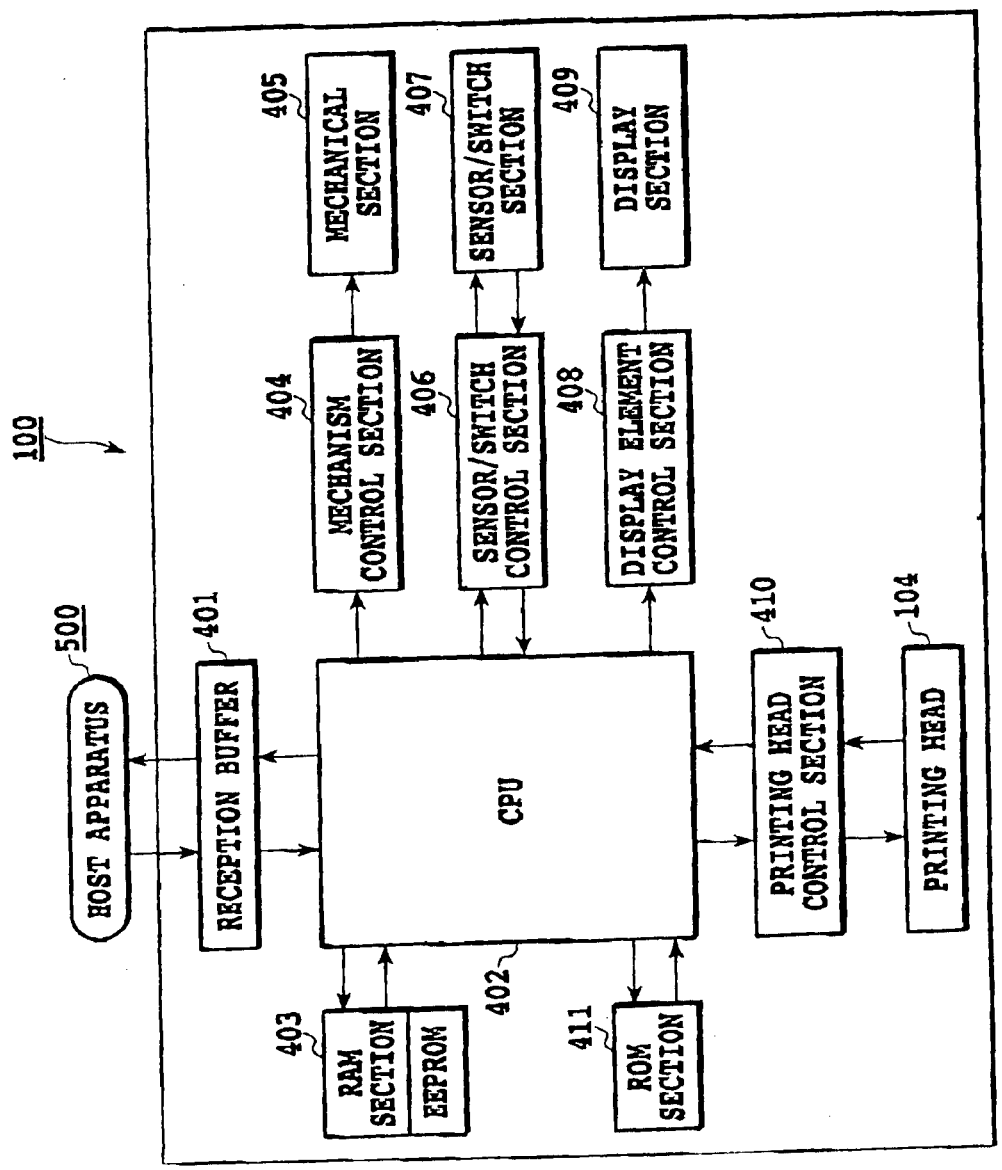
FIG. 3 is a block diagram of a major part of a control system of the inkjet printing apparatus shown in FIG. 1.

FIG. 3 is a block diagram showing a major part of the inkjet printing apparatus to which the invention can be applied. When data including characters and/or images to be printed are transmitted from a host apparatus 500 to the printing apparatus 100 that is a subordinate apparatus, the data are stored in a reception buffer 401 in the printing apparatus 100. Further, data for checking whether the data are properly transferred or not and data indicating the state of operation of the printing apparatus 100 are transmitted from the printing apparatus 100 to the host apparatus 500. The host apparatus may be in the form of a personal computer, digital camera, or an image scanner, and it is an apparatus capable of transmitting printing data to the printing apparatus which is the subordinate apparatus through an interface according to specifications such as USB (Universal Serial Bus) specifications.

The data stored in the reception buffer 401 are processed into data which are to be printed as main scanning of the printing head 104 proceeds under control of a CPU 402 and which are stored in a print buffer section provided in a random access memory (RAM) section 403. The data in the print buffer section are transferred to the printing head 104 by a printing head control section 410, and characters and images are printed by controlling the energization of the heating elements of the printing head. The printing head control section 410 detects information such as temperature information indicating the state of the printing head 104 and sends it to the CPU 402, and the CPU 402 transmits information to the printing head control section 410 to control the printing head 104 according to the state.

A mechanism control section 404 controls driving of a mechanical section 405 including a main scanning motor and a sub-scanning motor according to commands from the CPU 402. A sensor/switch control section 406 transmits signals from a sensor/switch section 407 including various sensors and switches to the CPU 402. Further, a display element control section 408 is configured to control a display portion 409 including LEDs and/or liquid crystal display elements provided on the control panel section 108 according to commands from the CPU 402.

A ROM 411 stores fixed data such as a program associated with a control procedure executed by the CPU 402.

In the present embodiment, a part of a storage region of the RAM section 403 is constituted by an EEPROM, and setting values for registration and content of a flag F indicating whether a setting has already been made or not are maintained even when the power supply of the printing apparatus is off.

In the present embodiment, the printing apparatus is capable of printing in the four colors Bk, C, M, and Y and is set in advance such that the positions where dots are formed in the four colors are aligned with each other during printing in one direction. The setting can be easily made because the groups of ejection openings for the colors Bk, C, M, and Y, respectively, are configured such that they are linearly arranged in the sub-scanning direction in parallel with each other as shown in FIG. 2. Under the preset condition, dots of each of the black ink and the color inks can be maintained for a long time in a state in which their forming positions are aligned in the main scanning direction during printing in one direction. The reason is that the ejection openings for the ink in each color can be integrally formed at a manufacturing step that is as precise as a semiconductor manufacturing step, and there are few problems associated with registration in the sub-scanning direction.

However, according to a method in which an image is formed while performing main scans in two directions during each interval between sub-scans, the printing positions of dots can drift between the main scans performed back and forth in the two directions, and an adjustment may therefore be required when printing is performed in the two directions even if proper registration is achieved in printing only in one direction. This is attributable to drifts of landing positions of ink that are physically determined by the main scanning speed, the timing of ink ejection, the ink ejecting speed, and the distance from the position of the ejection openings of the printing head to the surface of the printing medium. In particular, the major reason is the fact that the distance from the position of the ejection openings of the printing head to the surface of a printing medium subtly varies from apparatus to apparatus.

Under the circumstance, in the present embodiment, a check pattern is formed, for example, by printing rule marks extending in the vertical direction (the sub-scanning direction) using ink in a predetermined color with the timing of ink ejection zshifted by a predetermined amount between main scans in the forward and backward directions. A setting value for registration can be obtained by visually checking the state of alignment between rule marks formed by the main scans in the forward and backward directions.

Figure 4:
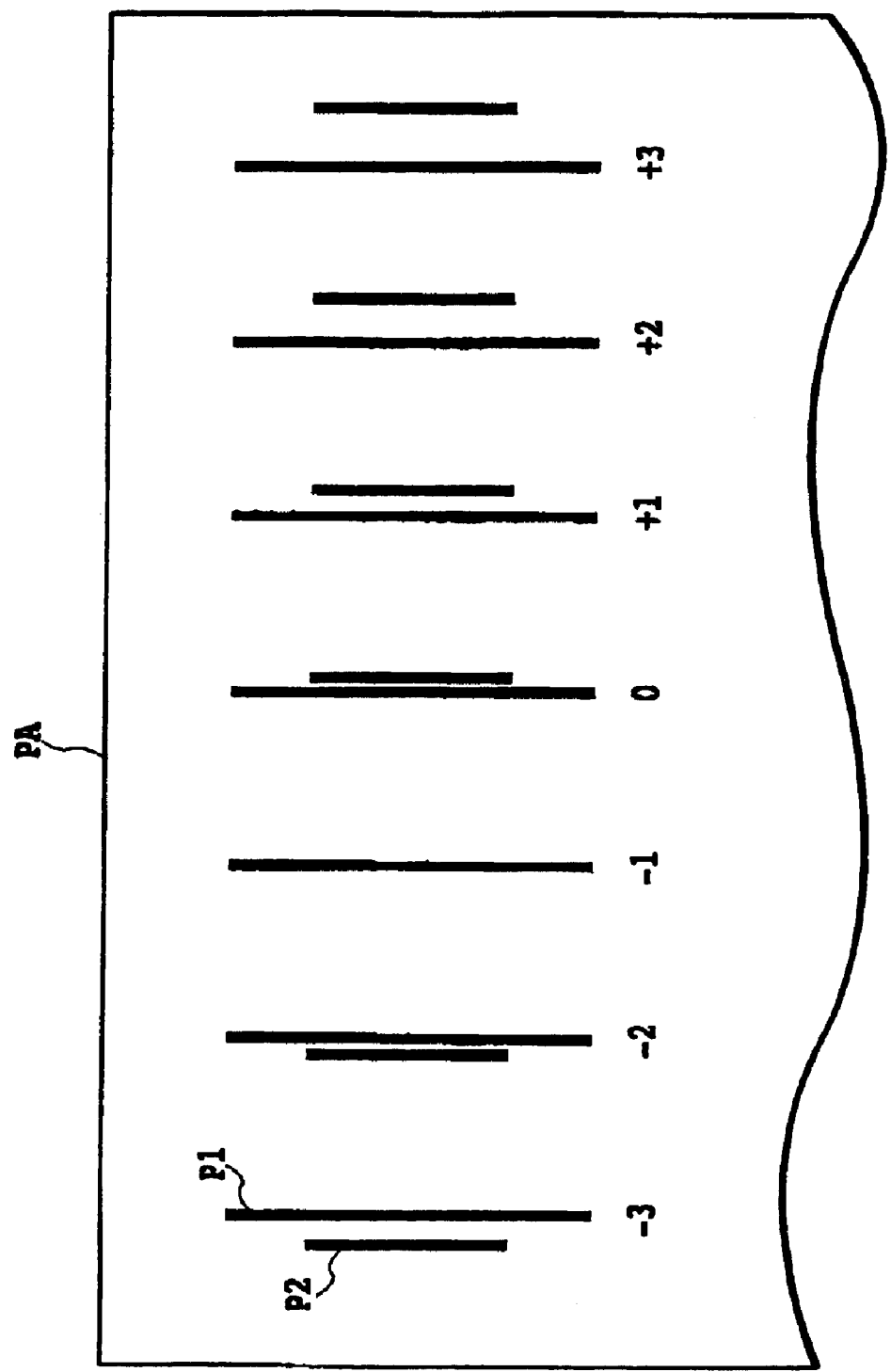
FIG. 4 illustrates an example of a check pattern formed to obtain a setting value for aligning dot positions when using the printing head in FIG. 2.

FIG. 4 shows an example of the check pattern. In this example, main scanning of the printing head 104 is performed in the forward direction relative to a printing medium to print vertical rule marks P1 at equal time intervals using ink in a predetermined color while the head is moved in a predetermined area PA. Thereafter, main scanning of the printing head 104 is performed in the backward direction relative to the printing medium. Thus, a vertical rule mark P2 is printed at a time for a position "0", i.e., a time at which a vertical rule mark printed by the main scan in the forward direction is assumed to be aligned with a vertical rule mark printed by the main scan in the backward direction, and rule marks P2 are also printed at times for positions "–3", "–2", "–1", "+1", "+2", and "+3" which are shifted to the left and right of the position "0" predetermined respective distances. That is, seven types of patterns are formed, each pattern consisting of a vertical rule mark P1 printed by the main scan in the forward direction and a vertical rule mark P2 with a predetermined shifting amount of recording timing printed by the main scan in the backward direction. The states of alignment between the rule marks P1 and P2 can be visually checked to select the pair in the best state of alignment. A setting value for registration can be thus obtained. In the illustrated example, the rule marks are aligned with each other in the position "–1" which may be then input as a setting value through an input unit of a host apparatus or the operation panel section 108 of the printing apparatus. The input setting value is stored in the EEPROM.

The present embodiment employs a configuration in which adjustment can be performed with accuracy of about 21 $\mu$m in the main scanning direction. An initial setting value (default value) may be set at "0".

The vertical rule marks printed in the forward and backward main scans may be in the same color or in different colors, and it is preferable to use color(s) that allows a deviation to be easily visually perceived. In particular, since misregistration is most perceivable to human eyesight during color printing, a color ink may be used. Further, since the rows of ink ejection openings are formed at predetermined intervals in the main scanning direction, registration can be achieved for all colors even if only one or two colors are used for printing during forward and backward main scans.

However, setting may be carried out for each color. The check pattern may be formed and used for setting in a manner as disclosed in Japanese Patent Application Laid-open No. 10-264485 (1998).

When a personal computer (hereinafter abbreviated as "PC") is used as a host apparatus, the user may be prompted by a graphical user interface (GUI) provided by the printer driver for the setting process for registration prior to the first printing operation performed after the printing apparatus is installed or connected. In response, the user can activate the same process on the PC by performing a predetermined operation on the GUI of the printer driver. The activation may be carried out with a predetermined input unit provided at the printing apparatus. Further, data for printing the check pattern as shown in FIG. 4 may be supplied from the PC or may alternatively be stored in the ROM of the printing apparatus in advance. The setting value may be input from an input unit provided with the PC or may be input through the operation panel section 108 of the printing apparatus.

In any case, it is known at this point in time whether the setting process for registration has been carried out or not. It is considered that the process is carried out in most cases and, when the process is not performed, the omission is regarded as the user's choice. When the process is performed, the setting value for bidirectional printing ("−1" in the example) is stored in the EEPROM, and "1" is set in the flag F. When the process is not performed, the content of the flag F and the setting value both stay at the default setting "0".

Figure 5:
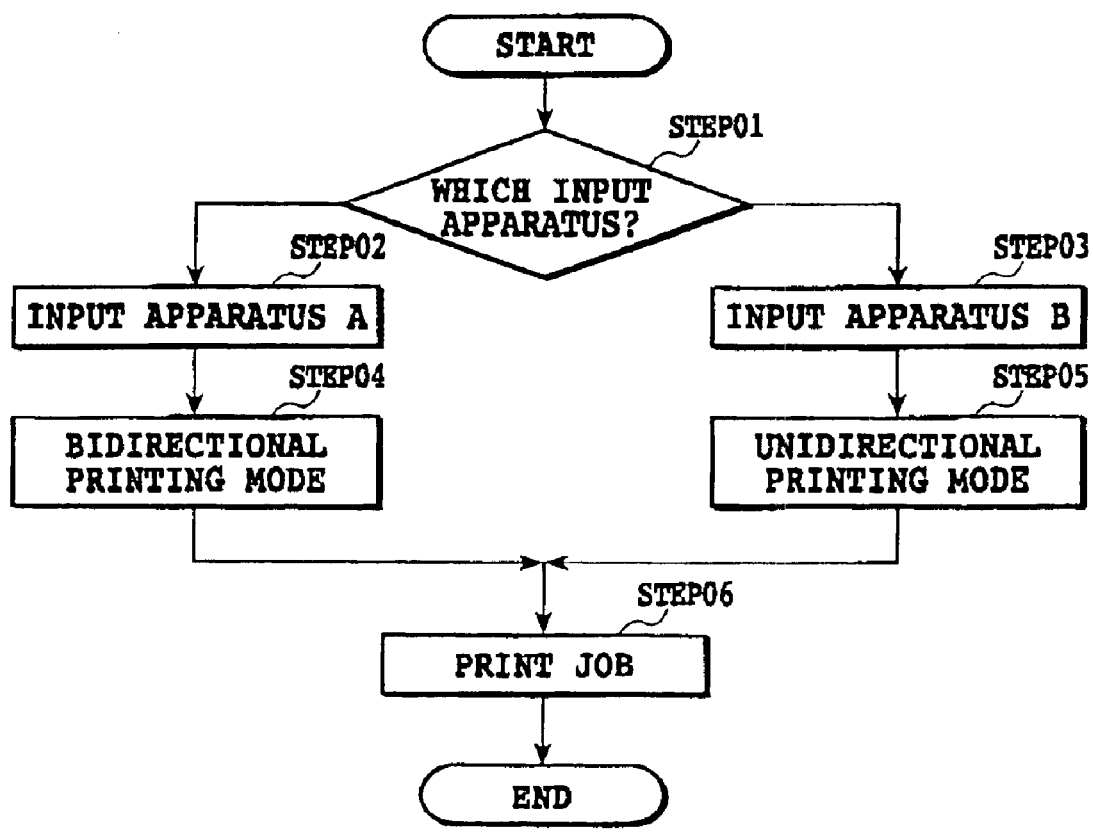
FIG. 5 is a flow chart showing processing steps performed by a printing apparatus in an embodiment of the invention during printing of a job.

FIG. 5 is a flow chart showing a procedure of a process performed by the printing apparatus during printing of a job according to the present embodiment.

First, the process branches at STEP 01 according to a judgment on the data to be printed by the printing apparatus, i.e., from which of plural types of connectable input devices the job has been input. The data input interface of the printing apparatus may be in accordance with USB specifications.

When the data have been input from a PC, the process proceeds to STEP 02 where it is recognized as "input apparatus A", the process then proceeding to STEP 04. When the input has come from a digital camera, the process proceeds to STEP 03 where it is recognized as "input apparatus B", the process then proceeding to STEP 05. The judgment may be based on discrimination according to the presence or absence of a signal that is added before the input data. The signal may be added by a printer driver operating in the PC. Alternatively, the judgment may be made by analyzing the protocol specific to the host apparatus.

When the host apparatus is a PC, the setting process for registration can be performed according to a prompt provided by a GUI of the printer driver as described above, and it normally seems reasonable to consider that the process has already been performed prior to the initial use of the printing apparatus and that a setting value for the process has already been stored. When the host apparatus is a digital camera, it seems reasonable in most cases to consider that the setting process for registration has not been performed yet. In the present embodiment, therefore, the former and latter apparatus are recognized as "input apparatus A" and "input apparatus B", respectively, which are to perform printing in different modes.

Specifically, when an "input apparatus A" is recognized, a bidirectional printing mode is selected and set from among a plurality of printing modes at STEP 04. On the contrary, when an "input apparatus B" is recognized, a unidirectional printing mode is selected and set at STEP 05. Then, the entire job (one page when the job is equivalent to one page or a plurality of pages when the job covers a plurality of consecutive pages) is printed in the set mode at STEP 06. When printing is performed in the bidirectional printing mode, the timing of ejection during printing in the forward and backward directions is corrected using the setting value stored in the EEPROM.

In the present embodiment, when an "input apparatus B" is recognized or when it is considered that the setting process for registration has not been performed yet, the unidirectional printing mode is set. Although the speed of printing is then decreased to about one half of that in the case wherein an "input apparatus A" is recognized no reduction is seen in the quality of a resultant image. That is, printing at a high speed and high quality can be automatically performed when an "input apparatus A" is recognized (or when it is considered that the setting process for registration has already been performed), and printing can be automatically performed with high quality also when an "input apparatus B" is recognized (or when it is considered that the setting process for registration has not been performed yet).

The type of the input apparatus is determined for each job in the processing procedure of the present embodiment because the host apparatus will not be changed during a single job, and the determination may obviously be made for each page.

Even when an "input apparatus A" is recognized, the process may proceed to STEP 05 if the content of the flag F provided in the EEPROM is "0" (default value) as a result of a reference made to the same. It is thus possible to prevent any reduction in image quality in cases such as when the setting process for registration has not been performed in practice even though a PC is connected.

Further, although the recognition of an "input apparatus A" and an "input apparatus B" has been described as indicating the connection of a PC and a digital camera, respectively, they have obviously been described by way of example.

(Embodiment 2)

Although data input from an input apparatus are analyzed to judge the type of the input apparatus in the above-described Embodiment 1, this is not limiting the invention. The printing apparatus may be equipped with a plurality of interfaces for inputting data, and a judgment may be made as to which of the interfaces is being used for the connection of a host apparatus.

Figure 6:
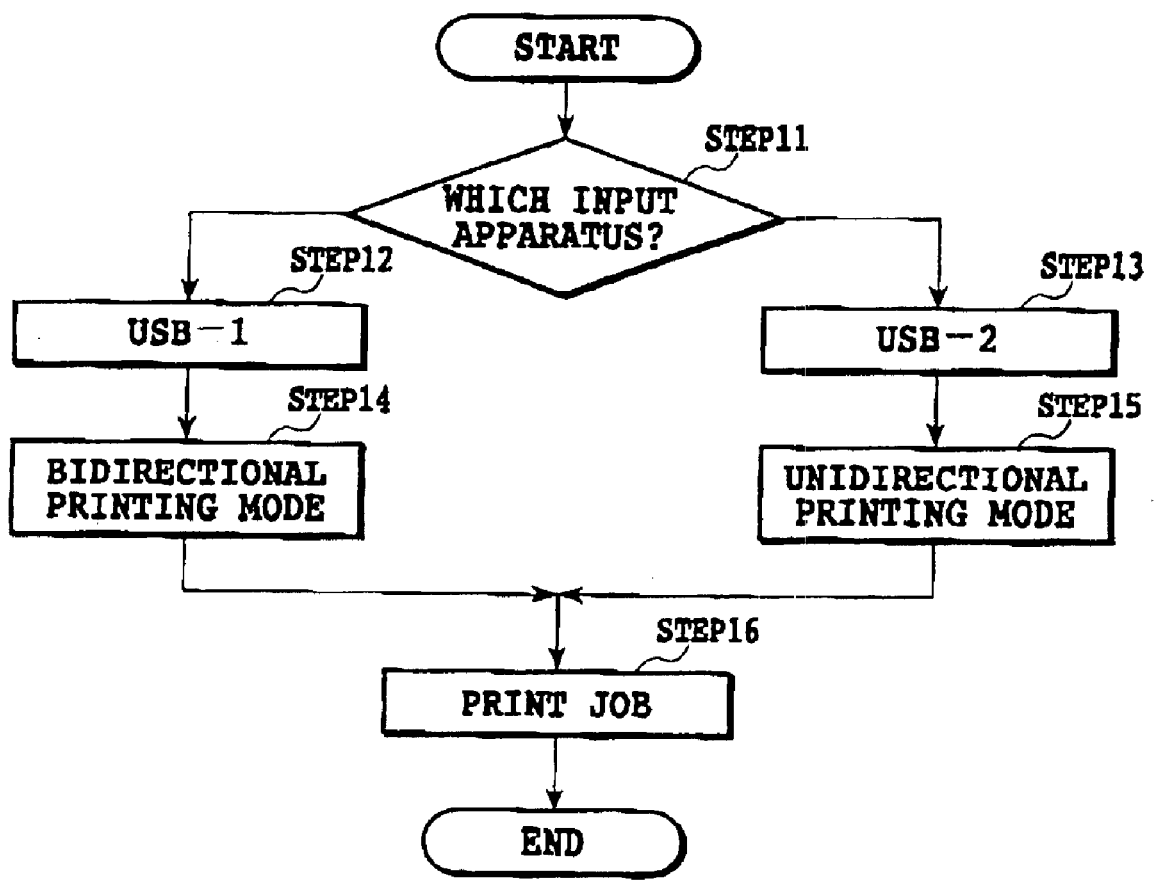
FIG. 6 is a flow chart showing processing steps performed by a printing apparatus in another embodiment of the invention during printing of a job.

FIG. 6 is a flow chart showing a procedure for a process performed by a printing apparatus during printing of a job according to Embodiment 2. A plurality of interfaces are provided on the printing apparatus in which the processing procedure is used, and the processing procedure judges the interface through which input data have been input to set a printing mode. Referring to the plurality of interfaces, the present embodiment employs two interfaces which are both in compliance with the USB specifications, for example. Hereinafter, one of the interfaces is referred to as "USB-1", and the other is referred to as "USB-2". A PC is connected to the interface "USB-1", and a digital camera is connected to the interface "USB-2". Although cables may be connected to those interfaces simultaneously, the type of an input apparatus can be determined only by detecting the presence or absence of a signal input through the interface "USB-1".

First, the process branches at STEP 11 according to a judgment on input data, i.e., a judgment of the interface through which the job has been input. It is determined whether an input signal has appeared on the interface "USB-1" in response to the input of a printing signal. In the case of a positive judgment, the signal is recognized as an input from a PC at STEP 12, and the process proceeds to STEP 14. In the case of a negative judgment, i.e., if there is a printing signal in spite of the absence of a signal input through the interface "USB-1", it is judged to be a printing signal from the interface "USB-2" and recognized as a signal input from an apparatus other than a PC at STEP 13, and the process proceeds to STEP 15. A digital camera falls under the latter case.

Then, printing is performed in different modes for the former case and the latter case just as in Embodiment 1. Specifically, in the former case, a bidirectional printing mode is selected and set from among a plurality of printing modes at STEP 14. In the latter case, a unidirectional printing mode is selected and set at STEP 15. Then, the entire job (one page when the job is equivalent to one page or a plurality of pages when the job covers a plurality of consecutive pages) is printed in the set mode at STEP 16. When printing is performed in the bidirectional printing mode, the timing of ejection during printing in the forward and backward directions is corrected using a setting value stored in the EEPROM.

The present embodiment provides the same advantages as those of Embodiment 1. The present embodiment may be modified similarly to Embodiment 1.

(Embodiment 3)

In Embodiments 1 and 2, an automatic switching takes place between bidirectional printing and unidirectional printing basically depending on the type of the input apparatus. However, when a configuration is employed in which the printing apparatus itself can correct ejection tang for forward and backward printing using a setting value stored in an EEPROM once the setting process for registration is performed, printing can be performed at a high speed by selecting the bidirectional printing mode even for an input from an apparatus other than a PC.

Figure 7:
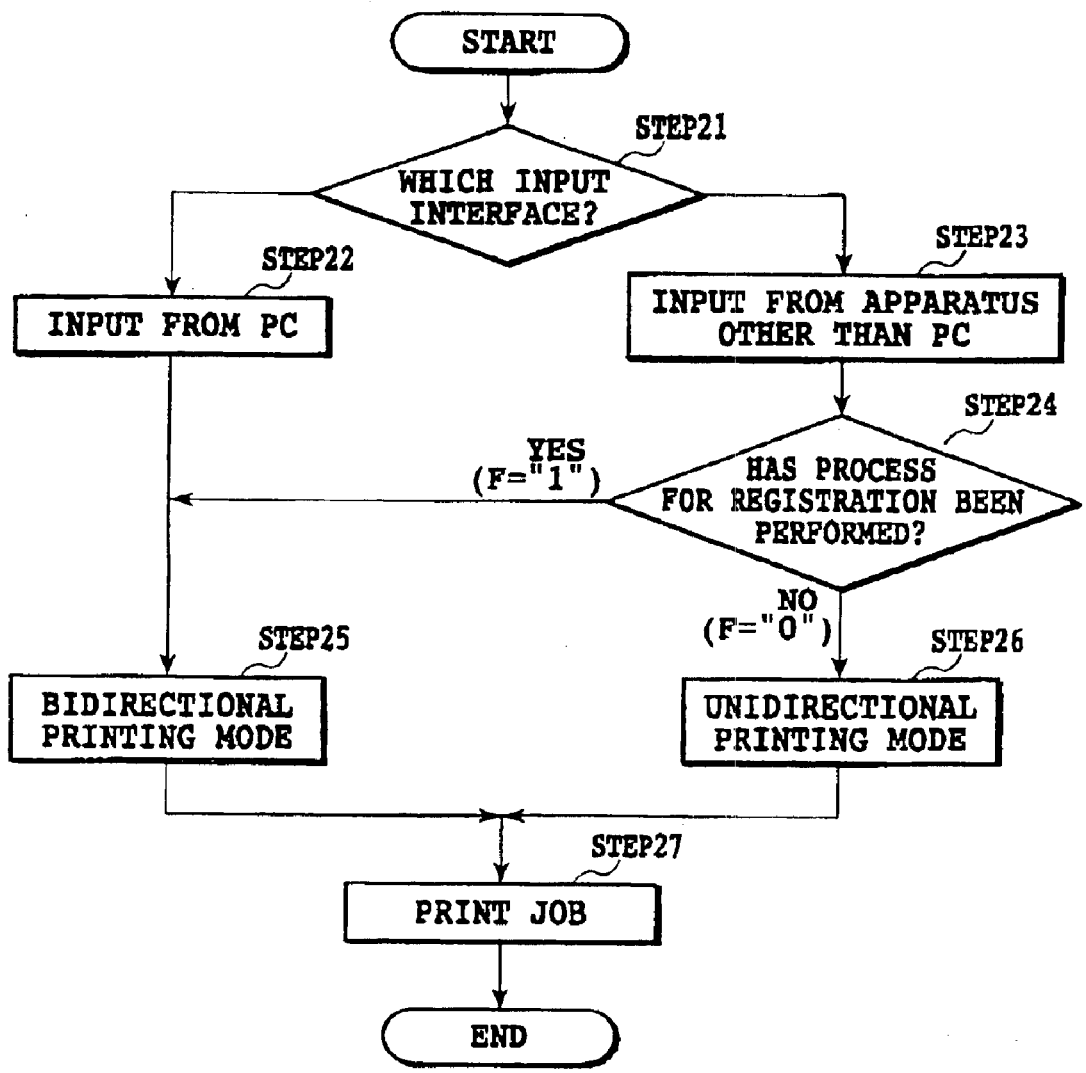
FIG. 7 is a flow chart showing processing steps performed by a printing apparatus in still another embodiment of the invention during printing of a job.

FIG. 7 is a flow chart showing a procedure of a process performed by a printing apparatus during printing of a job according to Embodiment 3.

First, the process branches at STEP 21 by judging the host apparatus from which input data have been input. Referring to the method of judgment, the input data may be analyzed as done in Embodiment 1, or interfaces may be checked as done in Embodiment 2.

STEP 22 is performed when the input is recognized as an input from a PC, and STEP 23 is performed when the input is recognized as an input from an apparatus other than a PC (specifically a digital camera). In the latter case, it is further judged at STEP 24 whether the setting process for registration has already been performed or not. Specifically, a flag F in an EEPROM is set at "1" (a setting value is also stored) if the same process has been performed prior to the initial use of the apparatus when the printing apparatus has been connected to a PC to be used for printing in the past, and the flag F remains "0" if the process has not been performed. The judgment can therefore be made by checking the state of the flag.

When it is judged at STEP 24 that the content of the flag F is "1" or when the setting process for registration has already been performed even though the input apparatus is not a PC and when the input apparatus is recognized as a PC, a bidirectional printing mode is selected and set from among a plurality of printing modes at STEP 25. When it is judged at STEP 24 that the content of the flag F is "0" or when the input apparatus is not a PC and the setting process for registration has not been performed yet, a unidirectional printing mode is selected and set at STEP 26.

Then, a process of printing the job is performed in the set mode at STEP 27. When the printing is performed in the bidirectional mode, the timing of ejection during forward and backward printing is corrected using the setting value stored in the EEPROM. That is, even when a digital camera configured without the capability of activating the setting process for registration is used, the printing is performed in the bidirectional printing mode using the setting value to achieve high speed and high quality printing provided that the process has been performed in the past by connecting the printing apparatus to a PC.

The present embodiment may be modified similarly to Embodiment 1. In particular, when an input from a PC is recognized, a reference may be made to the flag F provided in the EEPROM, and STEP 25 may be entered if the content of the same is "0". It is therefore possible to prevent any reduction in image quality in cases such as when the setting process for registration has not been performed in practice even though a PC is connected.

(Embodiment 4)

Although corrections for aligning dot positions during printing are made by the printing apparatus in the above-described embodiments, this is not limiting the invention. Printing data may be transmitted after being corrected by a host apparatus.

While the above-described embodiments have a configuration in which a printing apparatus stores information on whether the process to allow registration (printing of a check pattern or input of a setting value) has been performed, the invention is not limited to the configuration. Such information may be stored through a process of a printer driver of a PC that is a host apparatus and may be transmitted to a printing apparatus prior to the transmission of printing data such that the printing apparatus performs bidirectional printing when the information is transmitted and unidirectional printing when it is not transmitted. The setting value may be also stored in the PC and transmitted along with the information to the printing apparatus.

In such cases, the information and setting value may be input using an input unit at the host apparatus or may be input through communication from the printing apparatus.

(Embodiment 5)

Although the embodiments described so far show examples in which the bidirectional printing mode or unidirectional printing mode is selected depending on whether the setting process for registration during bidirectional printing has been performed or not, the invention is not limited to them. The point is to print printing data from any input apparatus as fast as possible without sacrificing image quality by selecting an appropriate one from among various printing modes provided in a printing apparatus. That is, other modes of printing may obviously be selected as occasions demand as long as the modes satisfy such a purpose. Examples of such modes will be described below.

One factor associated with misregistration during bidirectional printing is the speed of main scanning, and the problem becomes more apt to occur as the speed increases. Therefore, in the case of a printing apparatus that can be enabled in a low speed scanning mode in which the main scanning speed or carriage moving speed is low, the same mode can be set to prevent misregistration when the setting process for registration has not been performed yet. On the contrary, when the setting process for registration has already been performed, a high speed scanning mode is enabled.

In Embodiment 5, therefore, when a main scanning speed set in the high speed scanning mode is about 635 mm/sec (25 in/sec), the main scanning speed in the low speed scanning mode is one half of the same or about 317.5 mm/sec (12.5 in/sec), for example. In this case, although the printing speed in the low speed scanning mode is as low as substantially one half of that in the high speed scanning mode, there is no reduction in the quality of a resultant image. That is, printing can be achieved at a high speed and high image quality when the setting process for registration has already been performed, and printing can be achieved with high image quality even when the setting process for registration has not been performed yet, bidirectional printing being performed in either case.

(Embodiment 6)

The purpose of printing data from various input apparatus as fast as possible without sacrificing image quality can be achieved by selecting ejection openings used for printing properly.

For example, a printing head may be used which has a first row of ejection openings arranged at a predetermined pitch (e.g., 300 dpi) in a direction different from the main scanning direction (e.g., the sub-scanning direction) and a second row of ejection openings arranged with an offset by one half of the pitch of the first row of ejection openings in the sub-scanning direction and which achieves a printing resolution that is twice the pitch (600 dpi) using the two rows of ejection openings. In such a case, the rows may be different from each other in printing conditions during a main scan in a particular direction, the difference originating from differences in the shape and ejecting angle of primary ink droplets that inherently contribute to dot formation and in the shape and ejecting angle of satellite droplets that follow the primary droplets In a printing head having such characteristics, it is frequently required to correct dot forming positions for each row in order to prevent any reduction in image quality.

Under such a circumstance, Embodiment 6 of the invention employs a mode in which a limit is put on the row of ejection openings to be used, i.e., printing is performed using either of the rows of ejection openings when the setting process for registration has not been performed yet. In this case, since a desired printing resolution is to be achieved by adjusting the amount of sub-scanning in order to avoid a reduction in image quality, the printing speed is as low as about one half of that in the case wherein no limit is put on the rows of ejection openings to be used. However, printing can be achieved at a high speed and high image quality when the setting process for registration has already been performed and can be achieved with high image quality even when the setting process for registration has not been performed yet.

When misregistration still occurs during bidirectional printing even though the limited row of ejection openings is used, it can be solved by setting the unidirectional printing mode. In this case, there is no reduction in the quality of a resultant image, although the printing speed is reduced by a factor of about four.

In the case of a printing head having a configuration in which there is a plurality of ejection openings in the sub-scanning direction, drifts or offsets in dot forming positions during bidirectional printing can be made less visually perceptible by reducing the range of ejection openings to be used for one main scan or reducing the printing width (band width) per main scan. The reason is that small band irregularities are characterized in that they are difficult for a man to visually perceive.

(Embodiment 7)

Although the embodiments described so far have a configuration in which printing is performed in different printing modes depending on whether a PC is connected or whether the setting process for registration has been performed (or whether it can be considered that the process has been performed), the invention is not limited to the same.

Since misregistration is very small offsets between the positions where dots are formed in respective colors, Embodiment 7 of the invention deals with the same by selecting a mode in which processing resolution is reduced when the setting for registration has not been performed. This is advantageous in that there is little reduction in the quality of an image such as a scenic photograph for which high resolution is not always required, although a reduction of the quality of an image is recognized because of the reduction in processing resolution when a fine image is to be obtained.

The processing resolution is resolution in which an image to be printed is rendered or the resolution of a process of converting an RGB signal input to the printing apparatus into a binary signal for each of black, cyan, magenta, and yellow. For example, in a specific example of the former case, the processing resolution is 600 ppi (pixels/in) when the setting process for registration has already been performed, and the processing resolution is 300 ppi when the setting process for registration has not been performed yet. In order to perform control according to the present embodiment, for example, in FIG. 5, when a PC is connected as a host apparatus, the processes at STEP 04 and STEP 05 may be changed such that rendering is performed at a processing resolution of 600 ppi when the setting process for registration has already been performed (or considered so) and performed at a processing resolution of 300 ppi in other cases. Referring to the printing resolution of the printing apparatus, it is 600 dpi in either case because it depends on the characteristics of the printing head.

In the present embodiment, the printing speed remains the same whether the setting process for registration has been performed or not, and the processing resolution can be automatically set.

(Embodiment 8)

Embodiments 1 to 6 have a configuration in which printing is performed by changing a printing mode when the setting for registration has not been made yet. The purpose is to prevent any reduction in image quality by performing printing at a low speed when the setting has not been made. However, it may be desired in some cases to perform printing at a high speed anyway even at the sacrifice of image quality of some degree. Such a case can be accommodated by providing another flag F2 and adding a process of entering, on a compulsory basis, the same printing mode as that performed after the setting process for registration regardless of whether the setting process for registration has actually been made or not when the flag F2 is set at the user's will.

Figure 8:
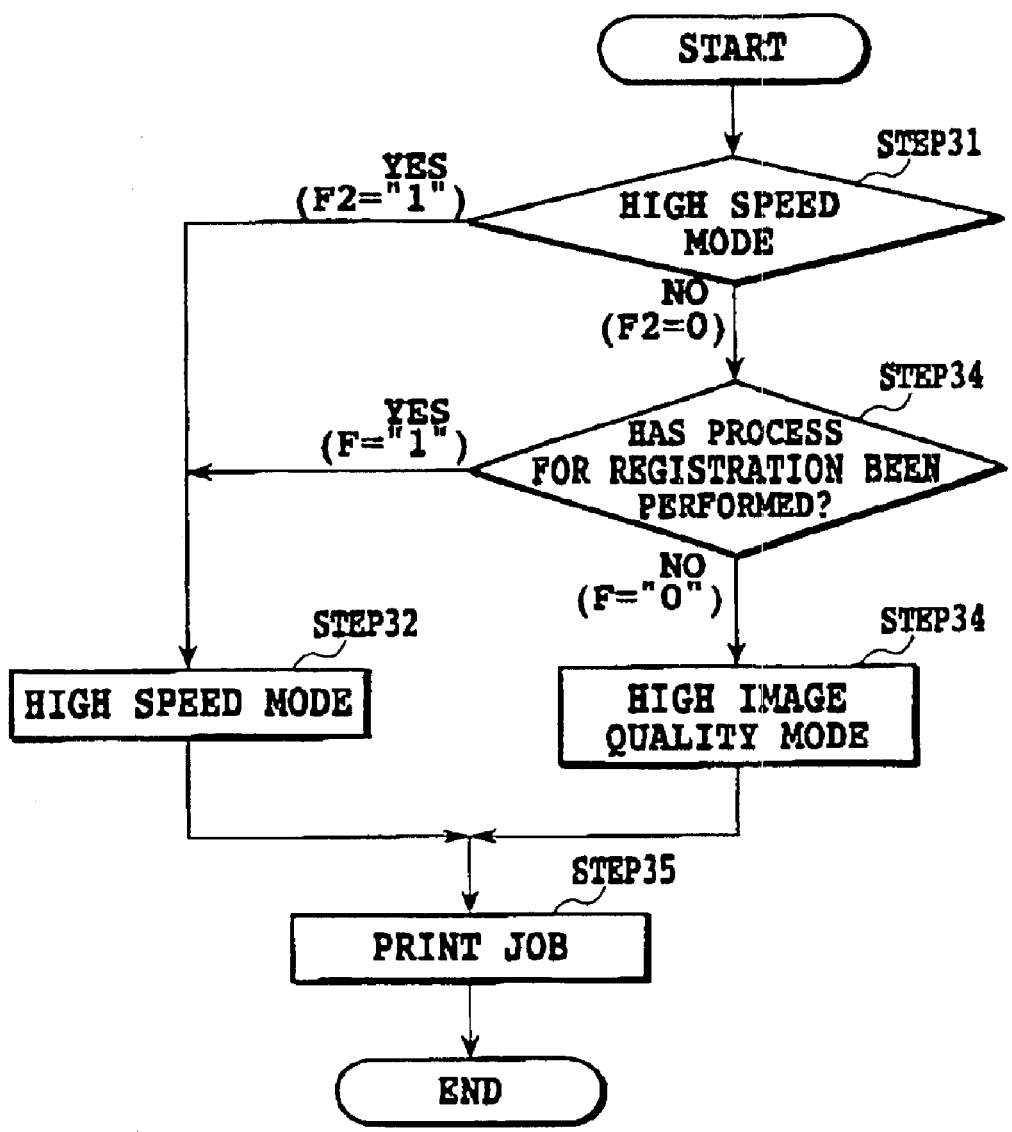
FIG. 8 is a flow chart showing processing steps performed by a printing apparatus in still another embodiment of the invention during printing of a job.

FIG. 8 is a flow chart showing a procedure of a process performed by a printing apparatus during a printing of a job according to Embodiment 8 of the invention.

A printing apparatus to which the present embodiment is applied is configured such that a user can set and change a mode in which high speed printing is performed on a compulsory basis using an appropriate input unit (a switch portion of the printing apparatus or a GUI of a printer driver) prior to printing. For example, judgment on whether the mode has been set or not can be made by providing a predetermined flag (F2) in the storage region of the RAM section 403 in the control system of FIG. 3 and by setting the flag (F2="1") in response to an operation of inputting the setting of the compulsory high speed printing mode and by resetting the flag (F2="0") in response to an operation of changing the setting.

Prior to printing, it is first judged at STEP 31 whether the user has selected the mode in which high speed printing is performed on a compulsory basis. If it is judged that the flag F2 is "1", i.e., the compulsory high speed mode is selected, the process proceeds to STEP 32 at which a mode for high speed printing such as bidirectional printing or high speed scanning is set.

If the flag F2 is "0", i.e., the compulsory high speed printing mode is not selected, the process proceeds to STEP 33. At STEP 33, it is judged whether the setting process for registration has been performed or not from the content of a flag F just as is done in the above embodiments. If the flag F is "1", since the setting process for registration has already been performed, the process proceeds to STEP 32 at which the mode for high speed printing is set. If the flag F is "0", since the setting process for registration has not been performed yet, the process proceeds to STEP 34 to set a mode for low speed printing such as unidirectional printing or low speed scanning which is aimed at prevention of a reduction in image quality. Then, STEP 35 performs a process of printing the job in the set mode.

In the processing procedure of the present embodiment, it is judged for each job whether the compulsory high speed printing mode is selected and whether the setting process for registration has been performed because it is considered that the contents of the flags F and F2 will not change during a single job. Obviously, the judgment may be made for each page. It is not necessary to provide the flag F2 in a region of an EEPROM if it is not required to maintain the content of the same when the power supply of the apparatus is off.

(Others)

Although unidirectional printing, limiting of the number of ejection openings to be used, and low speed main scanning have been referred to above as examples of the mode in which printing is performed at a low speed to prevent any reduction in image quality, the same mode is not limited to those methods.

For example, one method for achieving high image quality at the sacrifice of printing speed is a method called multi-pass printing wherein main scanning of a printing head is performed in a direction different from the direction in which a plurality of ejection openings are arranged; the printing medium is relatively transported in a sub-scanning direction orthogonal to the main scanning direction a distance smaller than the width of the array of the plurality of ejection openings during each interval between main scans: and an image is formed on the printing medium by a plurality of main scans according to pixel arrangements that are in a complementary relationship with regard to the same image area.

In a configuration that allows multi-pass printing as thus described, for example, a single image area may be printed by four main scans (passes) in the case of an input from a PC, and printing may be performed with a greater number of passes (e.g., eight passes) in the case of an input from an apparatus other than a PC.

Objects of the setting process for registration may include at least any of: prints respectively obtained by a forward scan and a backward scan when printing is performed by scanning a printing head back and forth relative to a printing medium; a print obtained by a first printing head or row of ejection openings among a plurality of printing heads or rows of ejection openings and a print obtained by a second printing head or row of ejection openings among the printing heads or rows of ejection openings, the prints being obtained in the direction in which the first and second printing heads or rows of ejection openings are scanned relative to the printing medium; and a print obtained by a first printing head or row of ejection openings among a plurality of printing heads or rows of ejection openings and a print obtained by a second printing head or row of ejection openings among the printing heads or rows of ejection openings, the prints being obtained in a direction different from the direction in which the first and second printing heads or rows of ejection openings are scanned relative to the printing medium. The setting process may be performed not only between different tones but also between a plurality of printing heads or rows of ejection openings that perform printing in the same tone as long as they have a configuration in which misregistration can be a problem.

Some of the above-described embodiments show examples wherein a printing mode is selected in which the printing speed is substantially decreased for printing data that are input when an apparatus other than a PC is connected as a host apparatus. In the case of an input from a PC, the printing apparatus accept each of the colors black, yellow, magenta, and cyan as binary data indicating whether it is printed or not. An input from an apparatus other than a PC may be a multi-valued RGB signal. In order to accommodate the same, the printing apparatus performs a process of converting the multi-valued signal into binary data for each of the colors black, yellow, magenta, and cyan through an arithmetic process in the CPU, and the arithmetic process requires a long time. The reason is that a printing apparatus employs a CPU that is lower in processing speed than those of PCs which recently employ CPUs capable of calculations at a high speed.

That is, the same printing image takes different amounts of time for completing the output even in the same printing mode depending on whether the data is input from a PC or not. Thus, it is not contradictory to perform bidirectional printing at a high speed for a PC and to print in a printing mode at a low printing speed for an apparatus other than a PC. Rather, the printing system can be regarded as keeping a good balance between a data calculating speed and a printing speed.

While the above description has shown cases wherein a process basically branches in two ways for a personal computer (PC) and an apparatus other than the same, the process may have three or more branches to allow an appropriate mode to be set. That is, the gist of the invention is to allow connection of plural types of input apparatus (whether they are wired or wireless apparatus) and to perform printing by setting a mode optimal for input data from an input apparatus thus connected.

In addition, the printing apparatus are not limited to those utilizing a printing head according to a method utilizing thermal energy as energy to be used for ejecting ink, and they may employ a printing head according to a method of ejection utilizing mechanical energy provided using, for example, a piezoelectric element. The invention is not limited to the inkjet method as thus described, and printing heads employing other printing methods may be used.

The invention is not limited to PCs as described above, and it is compatible with computers such as office computers and workstations. In particular, when an input apparatus having at least a function of prompting the execution of the setting process for registration is connected to a printing apparatus capable of the same process, the same mode as that performed for a PC in the above embodiments may be selected when the connection of the apparatus is recognized.

In particular, when a computer has the feature according to Embodiment 4, the computer may be supplied with a program or a program code of a printer driver for achieving the feature and may be operated according to the program code stored therein, such a computer being included in the scope of the invention.

In this case, the program code itself provides a novel feature of the invention, and the program code itself and a unit for supplying the program code to the computer using communication or a storage medium are also included in the scope of the invention.

As the storage medium for supplying the program code, for example, a hard disk, an optical disk, a magneto-optical disk, a CD-R, a DVD, a magnetic tape, a non-volatile memory card, or a ROM may be used as well as a flexible disk or a CD-ROM.

In addition, the function of the foregoing embodiments is realized not only by executing the program codes supplied to the computer but also by cooperatively executing the program codes together with an OS (operating system) active in the computer or other application software. Such system is also encompassed within the scope of the present invention.

Furthermore, a system, in which the supplied program codes are stored in a function expansion board of the computer or a memory provided in a function expansion unit connected to the computer, and then a part of or all of processes are executed by the CPU or the like provided in the function expansion board or the function expansion unit on the basis of the command from the program code, is also encompassed within the scope of the present invention.

As described above, the Invention made it possible to provide a printing apparatus capable of printing input data in proper adaptation to plural types of printing data input units and environments of use. In particular, it is possible to discriminate between a case wherein a setting process for registration has been performed and a case wherein the same process has not been performed based on an input unit connected to the apparatus and to perform appropriate printing processes for the respective cases.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A printing apparatus operable in plural types of printing modes and being connectable to plural types of input units for supplying printing data, comprising:
   recognition means for recognizing the type of a connected input unit; and
   selection means for selecting a printing mode suitable for printing of printing data supplied from the connected input unit from among the plural types of printing modes according to a recognition as to the type of printing unit recognized by said recognition means.

2. A printing apparatus as claimed in claim 1, said apparatus being capable of printing through first and second printing operations having printing positions aligned with each other, the selection being made according to a judgment as to whether the recognition and/or a setting process of setting an adjusting value for aligning the printing positions has already been performed or not.

3. A printing apparatus as claimed in claim 2, wherein the setting process is enabled when a predetermined type of input unit among the plural types of input units is connected.

4. A printing apparatus as claimed in claim 3, further comprising means for holding information indicating that the setting process has been performed.

5. A printing apparatus as claimed in claim 4, wherein said selection means selects the same printing mode as that in a case in which the predetermined type of input unit is connected if the information is held even when said recognition means recognizes the connection of an input unit other than the predetermined type of input unit.

6. A printing apparatus as claimed in claim 3, wherein judgement as to whether the setting process has been performed or not is not performed when the connection of the predetermined type of input unit is recognized.

7. A printing apparatus as claimed in claim 3, wherein the information indicating that the setting process has been performed is held in the predetermined type of input unit, and the information is transmitted prior to printing data when the predetermined type of input unit is connected.

8. A printing apparatus as claimed in claim 3, wherein the connection of the predetermined input unit is recognized based on a signal from the input unit.

9. A printing apparatus as claimed in claim 3, further comprising a plurality of connecting means, wherein the connection of the predetermined input unit is recognized based on the connection of the input unit to a predetermined one of the connecting units.

10. A printing apparatus as claimed in claim 3, further comprising:
    means for performing a main scan of printing means, formed by arranging an array of a plurality of printing elements, relative to a printing medium in a direction different from an arrangement direction of the array; and
    means for performing a relative sub-scan of the printing medium, after each main scan, in a direction orthogonal to the direction of the main scan,
    wherein the first and second printing operations are printing operations which are performed through main scanning of said printing means in a forward direction and a backward direction, respectively.

11. A printing apparatus as claimed in claim 10, wherein said selection means selects a printing mode for printing at a high speed when the connection of the predetermined type of input unit is recognized and selects a mode for printing at a low speed when the connection is not recognized.

12. A printing apparatus as claimed in claim 11, wherein the printing mode for printing at a high speed is a mode in which printing is performed in the forward direction and backward direction and wherein the printing mode for printing at a low speed is a mode in which printing is performed in either of the forward and backward directions.

13. A printing apparatus as claimed in claim 11, wherein the mode for printing at a low speed is a mode of printing in which the speed of the main scan is lower than that in the mode for printing at a high speed.

14. A printing apparatus as claimed in claim 11, wherein the mode for printing at a low speed is a mode in which the number of the printing elements involved in printing is limited compared to the mode for printing at a high speed.

15. A printing apparatus as claimed in claim 14, wherein a plurality of rows of the printing elements are arranged for a printing agent in the same tone in the direction of the main scan and wherein the number of rows of the printing elements used for printing in the mode for printing at a low speed is smaller than that in the mode for printing at a high speed.

16. A printing apparatus as claimed in claim 11, wherein
the sub-scan is performed in an amount smaller than the width of the array of the plurality of printing elements during each interval between the main scans;

an image can be formed on the printing medium by a plurality of main scans according to pixel arrangements that are in a complementary relationship with respect to the same image area; and the mode for printing at a low speed is a mode in which printing is performed with a greater number of main scans than in the mode for printing at a high speed.

17. A printing apparatus operable in plural types of image processing modes having different resolutions and being connectable to plural types of input units for supplying printing data, comprising:

recognition means for recognizing the type of a connected input unit; and selection means for selecting an image processing mode for processing printing data supplied from the connected input unit from among the plural types of image processing modes according to a recognition as to the type of connected input unit recognized by said recognition means.

18. A printing apparatus as claimed in claim 17, said apparatus being capable of printing through first and second printing operations having printing positions aligned with each other and capable of performing a process of setting an adjusting value for aligning the printing positions when a predetermined type of input unit among the plural types of input units is connected.

19. A printing apparatus as claimed in claim 18, wherein when the connection of the predetermined type of input unit is not recognized, an image processing mode which provides a resolution lower than that in the case in which the connection is recognized is selected.

20. A method for controlling a printing apparatus which is connectable to plural types of input units for supplying printing data and which is operable in plural types of printing modes, said method comprising the steps of:

recognizing the type of input unit connected to the printing apparatus; and selecting a mode suitable for printing of printing data supplied from the connected input unit from among the plural types of printing modes according to a result of said recognizing step.

21. A method for controlling a printing apparatus as claimed in claim 20, wherein the apparatus is capable of printing through first and second printing operations having printing positions aligned with each other, said selecting step being effected according to a judgment as to whether the result of said recognizing step and/or a process of setting an adjusting value for aligning the printing positions has already been performed or not.

* * * * *

UNITED STATES PATENT AND TRADEMARK OFFICE
CERTIFICATE OF CORRECTION

PATENT NO. : 6,921,218 B2  Page 1 of 1
APPLICATION NO. : 10/718721
DATED : July 26, 2005
INVENTOR(S) : Moriyama et al.

It is certified that error appears in the above-identified patent and that said Letters Patent is hereby corrected as shown below:

COLUMN 1
Line 64, "same" should read --same.--.

COLUMN 6
Line 21, "zshifted" should read --shifted--.

COLUMN 9
Line 31, "tang" should read --timing--.

COLUMN 15
Line 30, "Invention" should read --invention--.

Signed and Sealed this

First Day of August, 2006

JON W. DUDAS
*Director of the United States Patent and Trademark Office*